United States Patent
Mizukawa et al.

[11] Patent Number: 5,891,261
[45] Date of Patent: Apr. 6, 1999

[54] METHOD OF STRIPPING A STRIPPABLE COATING FILM

[75] Inventors: Shinpei Mizukawa, Kuki; Toshio Iwase, Ora-gun; Yoshiyuki Okamoto; Tomonari Koike, both of Kanuma, all of Japan

[73] Assignees: Fuji Jukogyo Kabushiki Kainsha, Tokyo; Kansai Paint Co., Ltd., Hyogo-ken, both of Japan

[21] Appl. No.: 838,045

[22] Filed: Apr. 22, 1997

[30] Foreign Application Priority Data

Apr. 23, 1996 [JP] Japan ................................ 8-123941
Mar. 21, 1997 [JP] Japan ................................ 9-085583

[51] Int. Cl.⁶ ....................................................... B08B 7/00
[52] U.S. Cl. ................................ 134/19; 134/30; 134/35; 134/38
[58] Field of Search ................................ 134/19, 30, 32, 134/34, 35, 38, 40

[56] References Cited

U.S. PATENT DOCUMENTS

| 4,844,833 | 7/1989 | Komatsu et al. | 134/38 X |
| 4,900,364 | 2/1990 | Diedrich | 134/4 |
| 5,017,303 | 5/1991 | Komatsu et al. | 134/38 X |
| 5,143,949 | 9/1992 | Grogan | 523/334 |
| 5,273,059 | 12/1993 | Gross | 134/57 R |
| 5,632,822 | 5/1997 | Knipe, Jr. et al. | 134/22.12 |
| 5,660,641 | 8/1997 | Howe | 134/26 |
| 5,688,336 | 11/1997 | Millard, Jr. | 134/42 |

FOREIGN PATENT DOCUMENTS

| 0 250 915 | 6/1987 | European Pat. Off. . |
| 7-204578 | 8/1995 | Japan ................ B05D 7/14 |
| 1 588 628 | 4/1981 | United Kingdom . |
| 2 227 541 | 8/1990 | United Kingdom . |

*Primary Examiner*—Jill Warden
*Assistant Examiner*—Saeed T. Chaudhry
*Attorney, Agent, or Firm*—Pillsbury Madison & Sutro LLP

[57] ABSTRACT

A method of stripping a strippable coating film formed on a substrate from the substrate, which method comprises either (i) spraying a hot water or water vapor at a predetermined temperature onto a strippable coating film having a surface temperature lower than 15° C. for heating, or (ii) spraying a cold water or water vapor at a predetermined temperature onto a strippable coating film having a surface temperature higher than 35° C. for cooling, so that the resulting surface temperature may be controlled in the range of 15 to 35° C. respectively, followed by stripping the resulting strippable coating film respectively.

6 Claims, No Drawings

METHOD OF STRIPPING A STRIPPABLE COATING FILM

FIELD OF THE INVENTION

The present invention relates to a method of stripping a strippable coating film formed on a substrate.

BACKGROUND ART

A strippable coating composition has been coated onto a coat-finished automobile in the art so that a film appearance of a finished coating film on the coat-finished automobile may not change and an initial film appearance of the finished coating film may be maintained during such a period of time as from completion to passing into the possession of users of the coat-finished automobile (see, for example, Japanese Patent Application Laid-Open No.204578/95). In practice, the strippable coating film is stripped from the coat-finished automobile by hand prior to passing into the possession of users. Since the strippable coating film is generally such that the adhesion properties between the strippable coating film and the finished coating film on the automobile are undesirably increased during storage in the outdoors, a practicably guaranteed period of time to strip the strippable coating film has been determined for controlling increase in the above adhesion properties. However, stripping of the strippable coating film from some coat-finished automobiles has been carried out over the above practicably guaranteed period of time for stripping, resulting in producing a problem of reducing stripping workability of the strippable coating film. On the other hand, even within the above practicably guaranteed period of time for stripping, such problems have been produced that the strippable coating film may become hard so as to make stripping difficult during the winter season and that the strippable coating film may become soft so as to make stripping difficult during the summer season.

SUMMARY OF THE INVENTION

It is an object of the present invention to provide a method of stripping a strippable coating film formed on a substrate such as a coat-finished automobile from the substrate, which is capable of easily stripping the strippable coating film even during both winter and summer seasons.

That is, the present invention provides a method of stripping a strippable coating film formed on a substrate from the substrate, which method comprises either (i) spraying a hot water or water vapor at a predetermined temperature onto a strippable coating film having a surface temperature lower than 15° C. for heating, or (ii) spraying a cold water or water vapor at a predetermined temperature onto a strippable coating film having a surface temperature higher than 35° C. for cooling, so that the resulting surface temperature may be controlled in the range of 15° to 35° C. respectively, followed by stripping the resulting strippable coating film respectively.

DETAILED DESCRIPTION OF THE INVENTION

The strippable coating film in the present invention is preferably a coating film formed from an acrylic resin emulsion coating composition containing (meth)acrylic acid ester as an essential component, other polymerizable monomer as an optional component and carboxyl group-containing monomer in an amount of 5% by weight or less, and having a glass transition temperature of 5° to 30° C. and a weight average molecular weight of 3000 to 100000. The emulsion coating composition, if needed, may include color pigments, fillers, pigment dispersants, ultraviolet light absorber, ultraviolet light stabilizer, water repellent, organic solvent, anionic emulsifier, thickening agent, neutralizing agent, and other additives for use in the coating composition. The strippable coating film used in the present invention is preferably a non-crosslinkable one. A dry film thickness of the strippable coating film is preferably in the range of about 10 to 200 $\mu$m, particularly about 50 to 100 $\mu$m.

In the present invention, the substrate, on which the strippable coating film is formed, may preferably include a coat-finished automobile.

In the present invention, it is important to control the surface temperature of the strippable coating film in the range of 15° to 35° C. on stripping the strippable coating film. In the case where the surface temperature of the strippable coating film is within the above temperature range due to environmental temperature conditions, for example, in an air-conditioned chamber, season, etc., controlling of the above temperature range may be unnecessary. However, since it is preferable to impart suitable properities both in hardness and softness to the strippable coating film, spraying of a cold water may be preferable when the strippable coating film may stretch on stripping, and spraying of a hot water is preferable when the strippable coating film may be brittle so as to be torn to pieces on stripping. When the surface temperature of the strippable coating film is lower than 15° C., a hot water or water vapor at a predetermined temperature is sprayed onto the strippable coating film for heating so as to control the surface temperature of the strippable coating film in the range of 15° to 35° C., followed by stripping the strippable coating film from the substrate. On the other hand, when the surface temperature of the strippable coating film is higher than 35° C., a cold water or water vapor at a predetermined temperature is sprayed onto the strippable coating film for cooling so as to control the surface temperature of the strippable coating film in the range of 15° to 35° C., followed by stripping the strippable coating film from the substrate. The surface temperature of the strippable coating film may be measured, for example, by use of a thermistor thermometer.

In the present invention, a temperature of a hot water to be sprayed is in the range of about 20° to 90° C. preferably about 30° to 80° C., and a temperature of a cold water to be sprayed is in the range of about 5° to 30° C., preferably about 10° to 25° C. Spraying of the hot or cold water may be carried out directly by use of a vessel or by use of a hose fitted with a nozzle. Spraying of the water vapor may be carried out by controlling the temperature of the water vapor at the same temperature as that of the hot or cold water respectively by use of a hose fitted with a nozzle.

A non-crosslinkable, strippable coating film shows a large dependence on temperature and is prefered in that an effect due to the temperature of the hot or cold water is remarkable. Stripping the strippable coating film may usually be carried out by hand.

According to the method of stripping the strippable coating film in the present invention, on stripping the strippable coating film from the substrate, a hot water or water vapor at a predetermined temperature is sprayed onto a strippable coating film having a surface temperature lower than 15° C. for heating, or a cold water or water vapor at a predetermined temperature is sprayed onto a strippable coating film having a surface temperature higher than 35° C. for cooling, so that the resulting surface temperature may be controlled in the range of 15° to 35° C. respectively, followed by stripping the resulting strippable coating film having suitable properties both in hardness and softness, resulting in making it possible to easily strip the strippable coating film.

The present invention will be explained more in detail by the following Examples and Comparative Examples. The present invention should not be limited to the following Examples.

EXAMPLE 1

LAP GUARD L (Acrylic resin emulsion coating composition, trade name, marketed by Kansai Paint Co., Ltd.) was coated by a roller coating to be a dry film thickness of about 50 to 100 μm onto the surface of a finished coating film on a bonnet of a coat-finished automobile, followed by drying at 70° C. for 10 minutes to form a strippable coating film. Next, the resulting automobile was left to stand outdoors for 4 months with the results of a winter outdoor temperature of 8° C., a strippable coating film surface temperature of 8° C. and an automobile body temperature of 14.5° C., followed by spraying a hot water of about 67° C. onto the strippable coating film until the surface temperature of the strippable coating film reaches 28° C. with the automobile body temperature of 23° C. and by stripping the strippable coating film. As the result, since the strippable coating film had suitable properties in both hardness and softness, stripping was so easily carried out as to make it possible to complete stripping in about one minute per one coat-finished automobile with good stripping workability.

Comparative Example 1

Procedures of Example 1 were duplicated except that the hot water was not sprayed. As the result, since the strippable coating film was brittle and hardened, stripping of the strippable coating film was not easy, resulting in taking 20 to 30 minutes to complete stripping per one coat-finished automobile with poor stripping workability.

EXAMPLE 2

A strippable coating film was formed onto the coat-finished automobile in the same method as in Example 1. The resulting automobile was left to stand outdoors for 4 months with the results of a summer outdoor temperature of 30° C., a strippable coating film surface temperature of 50° C. and an automobile body temperature of 80° C., followed by spraying a cold water of about 15° C. onto the strippable coating film until the surface temperature of the strippable coating film reaches 30° C. with the automobile body temperature of 50° C., and by stripping the strippable coating film. As the result, stripping was completed in about one minute per one coat-finished automobile with good stripping workability.

Comparative Example 2

The procedures of Example 2 were duplicated except that the cold water was not sprayed to strip the strippable coating film. As the result, since the strippable coating film has been softened and largely stretched, stripping of the strippable coating film was not easily carried out so as to take 20 to 30 minutes for stripping per one coat-finished automobile with poor stripping workability.

What is claimed is:

1. A method of stripping a strippable coating film formed on a substrate from the substrate, said strippable coating film being a coating film formed by use of an acrylic resin emulsion coating composition, which method comprises either (i) spraying a hot water or water vapor at a predetermined temperature onto a strippable coating film having a surface temperature lower than 15° C. for heating, or (ii) spraying a cold water or water vapor at a predetermined temperature onto a strippable coating film having a surface temperature higher than 35° C. for cooling, so that the resulting surface temperature may be controlled in the range of 15° to 35° C. respectively, followed by stripping the resulting strippable coating film respectively.

2. A method as claimed in claim 1, wherein a hot water or water vapor at 20° to 90° C. is sprayed for heating.

3. A method as claimed in claim 1, wherein a cold water or water vapor at 5° to 30° C. is sprayed for cooling.

4. A method as claimed in claim 1, wherein the strippable coating film is a non-crosslinkable coating film.

5. A method as claimed in claim 1, wherein an acrylic resin constituting the acrylic resin emulsion coating composition contains (meth)acrylic acid ester as an essential component and a carboxyl group-containing monomer in an amount of 5% by weight or less, and has a glass transition temperature of 5° to 30° C. and a weight average molecular weight of 3000 to 100000.

6. A method as claimed in claim 1, wherein the substrate is a coat-finished automobile.

* * * * *